US010977526B2

United States Patent
Zhai et al.

(10) Patent No.: US 10,977,526 B2
(45) Date of Patent: Apr. 13, 2021

(54) METHOD AND APPARATUS FOR SAR IMAGE RECOGNITION BASED ON MULTI-SCALE FEATURES AND BROAD LEARNING

(71) Applicant: WUYI University, Guangdong (CN)

(72) Inventors: Yikui Zhai, Guangdong (CN); Cuilin Yu, Guangdong (CN); Zhiyong Hong, Guangdong (CN); Yanyang Liang, Guangdong (CN); Tianlei Wang, Guangdong (CN); Zhongxin Yu, Guangdong (CN); Wenbo Deng, Guangdong (CN); Junying Gan, Guangdong (CN); Zilu Ying, Guangdong (CN); Junying Zeng, Guangdong (CN)

(73) Assignee: WUYI University, Guangdong (CN)

( * ) Notice: Subject to any disclaimer, the term of this patent is extended or adjusted under 35 U.S.C. 154(b) by 53 days.

(21) Appl. No.: 16/530,453

(22) Filed: Aug. 2, 2019

(65) Prior Publication Data
US 2020/0380294 A1 Dec. 3, 2020

(30) Foreign Application Priority Data
May 30, 2019 (CN) .......................... 201910460194.6

(51) Int. Cl.
*G06K 9/62* (2006.01)
*G01S 13/90* (2006.01)
(Continued)

(52) U.S. Cl.
CPC .......... *G06K 9/629* (2013.01); *G01S 13/9027* (2019.05); *G06K 9/0063* (2013.01);
(Continued)

(58) Field of Classification Search
CPC .... G06K 9/46; G06K 9/0063; G06K 9/00268; G06K 9/629; G06K 9/3233;
(Continued)

(56) References Cited

U.S. PATENT DOCUMENTS

2016/0217319 A1* 7/2016 Bhanu ................. G06K 9/00281
2017/0231550 A1* 8/2017 Do ....................... G06K 9/4652
382/128

(Continued)

FOREIGN PATENT DOCUMENTS

| CN | 106682621 A | * | 5/2017 |
| CN | 106940782 A | * | 7/2017 |
| CN | 108416378 A | * | 8/2018 |

OTHER PUBLICATIONS

Singh P. and Shree R., A new SAR image despeckling using directional smoothing filter and method noise thresholding, May 24, 2018, Engineering Science and Technology, 21, 589-610.*

*Primary Examiner* — Matthew C Bella
*Assistant Examiner* — Kathleen M Broughton
(74) *Attorney, Agent, or Firm* — Farjami & Farjami LLP

(57) ABSTRACT

Disclosed are method and apparatus for SAR image recognition based on multi-scale features and broad learning. A region of interest of an original SAR image is extracted by centroid localization, the image is rotated and added with noise for enhancing the data volume, the image is down-sampled, LBP features and PPQ features are extracted, an LBP feature vector $X_{LBP}$ and an LPQ feature vector $X_{LPQ}$ are cascaded to achieve dimension reduction by principal component analysis to obtain a fusion feature data $X_m$, the fusion feature data $X_m$ is input to a broad learning network for image recognition and a recognition result is output. By fusing the LBP features and the LPQ features, complementary information is fully utilized and redundant information is reduced. The broad learning network is used to improve (Continued)

the training speed and reduce the time cost. As a result, the recognition effect is more stable, robust and reliable.

10 Claims, 3 Drawing Sheets

(51) Int. Cl.
  *G06K 9/00* (2006.01)
  *G06K 9/32* (2006.01)
  *G06K 9/46* (2006.01)
  *G06T 3/40* (2006.01)
  *G06T 3/60* (2006.01)
  *G06T 5/00* (2006.01)

(52) U.S. Cl.
  CPC ............. *G06K 9/3233* (2013.01); *G06K 9/46* (2013.01); *G06K 9/6256* (2013.01); *G06K 9/6262* (2013.01); *G06T 3/40* (2013.01); *G06T 3/60* (2013.01); *G06T 5/001* (2013.01); *G06T 2207/20081* (2013.01)

(58) Field of Classification Search
  CPC .. G06K 9/4671; G06K 9/6256; G06K 9/6262; G06K 9/6269; G01S 13/9027; G06T 3/40; G06T 3/60; G06T 5/001; G06T 5/002; G06T 2207/20081
  See application file for complete search history.

(56) References Cited

U.S. PATENT DOCUMENTS

2018/0082107 A1\* 3/2018 Li ...................... G06K 9/00281
2019/0108447 A1\* 4/2019 Kounavis ........... G06K 9/00355

\* cited by examiner

METHOD AND APPARATUS FOR SAR IMAGE RECOGNITION BASED ON MULTI-SCALE FEATURES AND BROAD LEARNING

CROSS REFERENCE TO RELATED APPLICATION

This application claims the benefit of CN patent application No. 201910460194.6 filed on May 30, 2019, the entire disclosures of which are hereby incorporated herein by reference.

TECHNICAL FIELD

The present disclosure relates to the field of image recognition, and in particularly, to a method and apparatus for SAR image recognition based on multi-scale features and broad learning.

BACKGROUND

SAR is one of the important means of earth observation. Due to its all-weather capability and strong penetrating imaging capability, SAR has been widely used in battlefield reconnaissance, intelligence acquisition and other fields. However, SAR images are sensitive to imaging orientation, and there is a lot of environmental noise in target data. Traditional recognition and classification methods have achieved a certain level in classification accuracy, but there are still many defects, such as low SAR image feature extraction performance, slow matrix convergence speed, long training time, complex parameter estimation, and low efficiency.

SUMMARY

An objective of the present disclosure is to provide a method and apparatus for SAR image recognition to solve at least one of the technical problems existing in the prior art, which improve the performance of SAR image recognition by multi-scale features and a broad learning network.

The technical solution adopted by the present disclosure to solve the problem thereof is as follows.

In a first aspect of the present disclosure, a method for SAR image recognition based on multi-scale features and broad learning is provided, including the following steps of:
inputting an original SAR image;
obtaining an SAR image including a region of interest by extracting the region of interest of the original SAR image by centroid localization;
obtaining a data-enhanced SAR image by rotating the SAR image including the region of interest and adding noise to enhance the data volume;
obtaining a multi-scale SAR image by downsampling the data-enhanced SAR image;
obtaining a LBP feature vector $X_{LBP}$ by extracting a LBP feature of the multi-scale SAR image;
obtaining a LPQ feature vector $X_{LPQ}$ by extracting a LPQ feature of the multi-scale SAR image to;
obtaining a fusion feature data $X_m$ by cascading the LBP feature vector $X_{LBP}$ and the LPQ feature vector $X_{LPQ}$ to achieve dimension reduction by principal component analysis to; and
outputting a recognition result by inputting the fusion feature data $X_m$ to a broad learning network for image recognition.

The method for SAR image recognition based on multi-scale features and broad learning has at least the following beneficial effects: the fusion feature data fusing the LBP features and LPQ features is used as an input of a broad learning network, which reduces redundant information and improves feature extraction performance while making full use of complementary information; the broad learning network is used to recognize an SAR image, which has a fast training speed, a small reconstruction cost, greatly reduces the time cost, and also reduces the influences of noise in the SAR image on a recognition result; as a result, the recognition effect is more stable, robust and reliable.

According to the first aspect of the present disclosure, obtaining an SAR image including a region of interest by extracting the region of interest of the original SAR image by centroid localization includes:
determining a centroid coordinate according to a centroid formula;
obtaining an L*L region of interest with the centroid as the center, and then obtaining the SAR image including the region of interest;
wherein L is an edge length of the region of interest; the centroid formula is $$(x_c, y_c) = \left(\frac{m_{10}}{m_{00}}, \frac{m_{01}}{m_{00}}\right),$$

where $(x_c, y_c)$ is the centroid coordinate, $m_{10}$ and $m_{01}$ are a first-order original matrix of the original SAR image, and $m_{00}$ is a zero-order original matrix of the original SAR image.

According to the first aspect of the present disclosure, obtaining a LBP feature vector $X_{LBP}$ by extracting a LBP feature of the multi-scale SAR image includes:
extracting the LBP feature of the multi-scale SAR image by an LBP feature operator; and
obtaining the LBP feature vector $X_{LBP}$ by cascading and fusing the LBP feature;
wherein the LBP feature operator is $$LBP_{p,r}(x_c, y_c) = \sum_{p=0}^{p-1} s(g_p - g_c) 2^p,$$

$$s(x) = \begin{cases} 1, & x \geq 0 \\ 0, & \text{others} \end{cases};$$

where $(x_c, y_c)$ is the centroid coordinate, $g_c$ is a centroid grayscale value, $g_p$ are pixel points distributed equidistantly on the circumference with the centroid as the center of a circle and r as the radius, and p is the number of $g_p$.

According to the first aspect of the present disclosure, outputting a recognition result by inputting the fusion feature data $X_m$ to a broad learning network for image recognition includes:
dividing the fusion feature data $X_m$ into a training set $X_1$ and a test set $X_2$;
optimizing a connection weight by inputting the training set $X_1$ to the broad learning network, and training the broad learning network; and
obtaining the recognition result by inputting the test set $X_2$ to the trained broad learning network.

According to the first aspect of the present disclosure, optimizing a connection weight by inputting the training set $X_1$ to the broad learning network, and training the broad learning network includes:

generating feature nodes by: inputting the training set $X_1$ to realize projection and generate i groups of feature nodes, wherein the $i^{th}$ group of feature nodes are $Z_i=\phi(X_1 W_{ei}+\beta_{ei})$, where $W_{ei}$ is a random matrix, $\beta_{ei}$ is an offset, and $\phi(\bullet)$ is a nonlinear activation function;

generating enhanced nodes by: inputting the training set $X_1$ to realize projection and generate m groups of enhanced nodes, wherein the $m^{th}$ group of enhanced nodes are $H_m \equiv \xi(Z^n W_{hm}+\beta_{hm})$, where $W_{hm}$ is a random matrix different from $W_{ei}$, $\beta_{hm}$ is an offset different from $\beta_{ei}$, $\xi(\bullet)$ is a nonlinear activation function different from $\phi(\bullet)$, and $Z^n$ denotes all the feature nodes; and optimizing the connection weight by: connecting the $i^{th}$ group of feature nodes and the $m^{th}$ group of enhanced nodes to obtain a combined matrix to serve as an actual input of the broad learning network, and calculating the connection weight of the broad learning network according to an output matrix Y as: $W_m=[Z_i|H_m]^+Y$; and continuously training the broad learning network by the training set $X_1$ to optimize the connection weight.

According to a second aspect of the present disclosure, an apparatus for SAR image recognition based on multi-scale features and broad learning applied to the method for SAR image recognition based on multi-scale features and broad learning according to the second aspect of the present disclosure is provided, including:

an image input module for inputting an original SAR image;

a region of interest extraction module for obtaining an SAR image including a region of interest by extracting a region of interest of the original SAR image by centroid localization;

a data enhancement module for obtaining a data-enhanced SAR image by rotating the SAR image including the region of interest and adding noise to enhance the data volume;

a downsampling module for obtaining a multi-scale SAR image by downsampling the data-enhanced SAR image;

an LBP feature extraction module for obtaining an LBP feature vector $X_{LBP}$ by extracting LBP features of the multi-scale SAR image;

an LPQ feature extraction module for obtaining an LPQ feature vector $X_{LPQ}$ by extracting LPQ features of the multi-scale SAR image;

a fusion feature module for obtaining fusion feature data $X_m$ by cascading the LBP feature vector $X_{LBP}$ and the LPQ feature vector $X_{LPQ}$ to achieve dimension reduction by principal component analysis; and a broad learning network module for outputting a recognition result by inputting the fusion feature data $X_m$ to a broad learning network for image recognition.

The apparatus for SAR image recognition based on multi-scale features and broad learning has at least one of the following beneficial effects: the network architecture is simple and with clear division of work; the fusion feature data fusing the LBP features and LPQ features is used as an input of a broad learning network, which reduces redundant information and improves feature extraction performance while making full use of complementary information; the broad learning network is used to recognize an SAR image, which has a fast training speed, greatly reduces the time cost, and also reduces noise influences in the SAR image; as a result, the recognition effect is more stable, robust and reliable.

BRIEF DESCRIPTION OF THE DRAWINGS

The present disclosure is further described below with reference to the accompanying drawings and examples.

DETAILED DESCRIPTION

Embodiments of the present disclosure will be described in detail as follows. Preferred embodiments of the present disclosure are illustrated in the accompanying drawings. The specification and drawings are, accordingly, to be regarded in an illustrative rather than a restrictive sense. It will, however, be evident that various modifications and changes may be made thereunto without departing from the broader spirit and scope of the invention as set forth in the claims.

Figure 1:
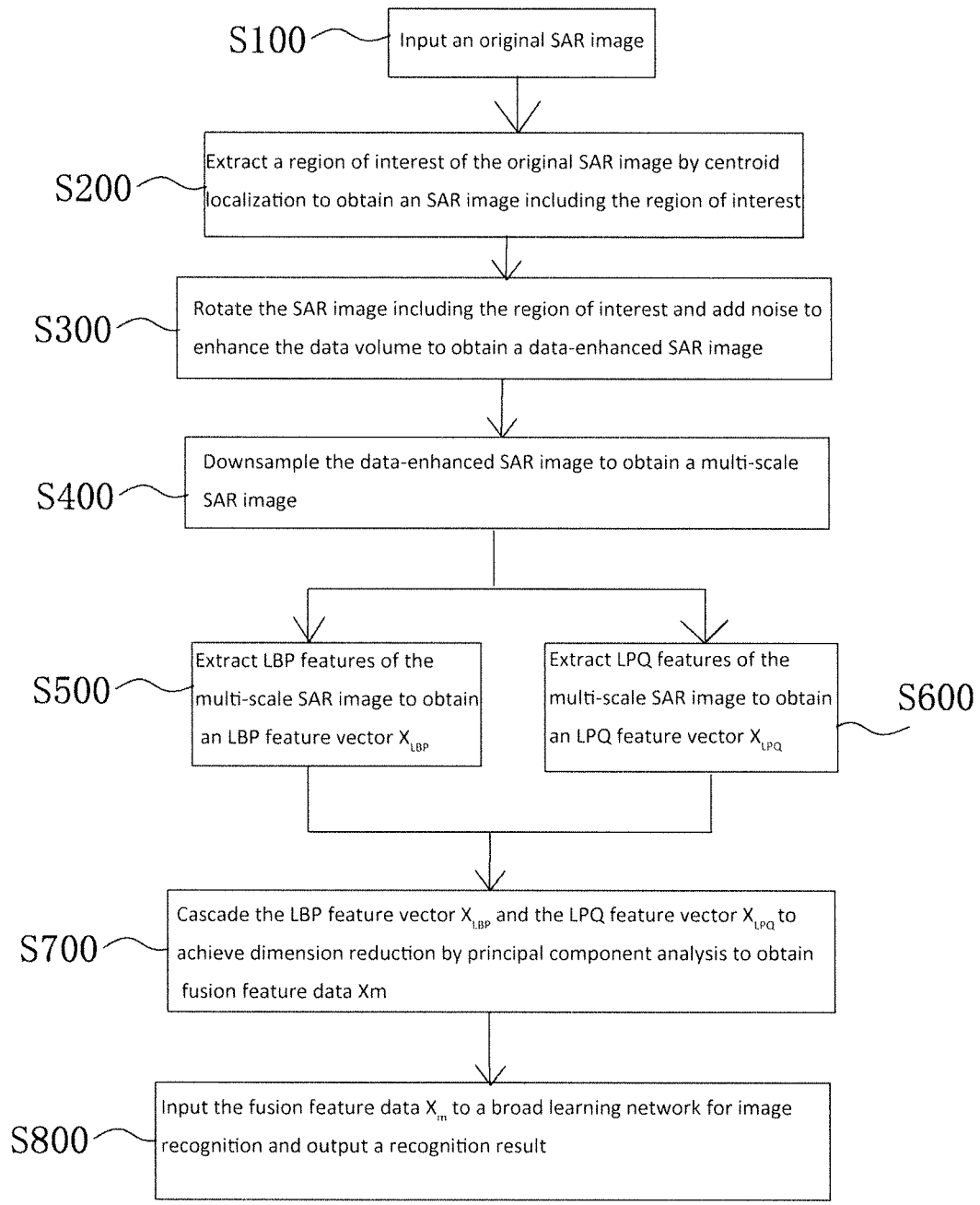
FIG. 1 is a flowchart of a method for SAR image recognition based on multi-scale features and broad learning according to an embodiment of the present disclosure.

Referring to FIG. 1, an embodiment of the present disclosure provides a method for SAR image recognition based on multi-scale features and broad learning, including steps of:

S100: inputting an original SAR image;

S200: extracting a region of interest of the original SAR image by centroid localization to obtain an SAR image including the region of interest;

S300: rotating the SAR image including the region of interest and adding noise to enhance the data volume to obtain a data-enhanced SAR image;

S400: downsampling the data-enhanced SAR image to obtain a multi-scale SAR image;

S500: extracting LBP features of the multi-scale SAR image to obtain an LBP feature vector $X_{LBP}$;

S600: extracting LPQ features of the multi-scale SAR image to obtain an LPQ feature vector $X_{LPQ}$;

S700: cascading the LBP feature vector $X_{LBP}$ and the LPQ feature vector $X_{LPQ}$ to achieve dimension reduction by principal component analysis to obtain fusion feature data $X_m$; and S800: inputting the fusion feature data $X_m$ to a broad learning network for image recognition and outputting a recognition result.

In this embodiment, the fusion feature data fusing the LBP features and LPQ features is used as an input of a broad learning network, which reduces redundant information and improves feature extraction performance while making full use of complementary information; the broad learning network is used to recognize an SAR image, which has a fast training speed, a small reconstruction cost, greatly reduces the time cost, and also reduces influences of noise in the SAR image on a recognition result; as a result, the recognition effect is more stable, robust and reliable.

Further, in step S200, a centroid coordinate is determined according to a centroid formula; an L*L region of interest with the centroid as the center is obtained, and then the SAR image including the region of interest is obtained, wherein L is an edge length of the region of interest, and L is smaller than the length and width of the original SAR image; the centroid formula is $$(x_c, y_c) = \left(\frac{m_{10}}{m_{00}}, \frac{m_{01}}{m_{00}}\right),$$

where $(x_c, y_c)$ is the centroid coordinate, $m_{10}$ and $m_{01}$ are a first-order original matrix of the original SAR image, and $m^{00}$ is a zero-order original matrix of the original SAR image. Through step S200, the dimension of the image is reduced, and influences of background noise are reduced.

Further, in step S300, the SAR image including the region of interest is rotated 360 degrees every 1 degree, achieving 360 times data enhancement; a random integer is added to the rotated SAR image as random noise to further enhance the data. The random integer is any integer in [−8, 8]. Through step S300, the data volume of the SAR image is enhanced greatly, which is conducive to the improvement of recognition accuracy.

Further, in step S400, the data-enhanced SAR image is downsampled. The downsampling is to reduce the pixels of the image to obtain a multi-scale SAR image. For example, an SAR image whose original size is 64 pixels*64 pixels are downsampled to obtain SAR images of 54 pixels*54 pixels, 45 pixels*45 pixels and 20 pixels*20 pixels.

Further, in step S500, the LBP features of the multi-scale SAR image are extracted by an LBP feature operator. The LBP features are a data matrix, and cascade fusion refers to horizontal parallel connection of the data matrix corresponding to the LBP features, and then the LBP feature vector $X_{LBP}$ is obtained. The LBP feature operator is $$LBP_{p,r}(x_c, y_c) = \sum_{p=0}^{p-1} s(g_p - g_c)2^p,$$

$$s(x) = \begin{cases} 1, & x \geq 0 \\ 0, & others \end{cases};$$

where $(x_c, y_c)$ is the centroid coordinate, $g_c$ is a centroid grayscale value, $g_p$ are pixel points distributed equidistantly on the circumference with the centroid as the center of a circle and r as the radius, and p is the number of $g_p$.

In step S600, LPQ features of the multi-scale SAR image are extracted by an LPQ algorithm to obtain an LPQ feature vector $X_{LPQ}$. The LPQ algorithm improves the robustness of fuzzy image recognition with the fuzzy invariance of the Fourier-transformed phase; phase information after Fourier transform is calculated in the neighborhood of each pixel point of the SAR image and quantified in a low-frequency component to form the LPQ features in the form of a data matrix. The LPQ features are cascaded and fused to obtain the LPQ feature vector $X_{LPQ}$.

In step S700, the LBP feature vector $X_{LBP}$ obtained in step S500 and the LPQ feature vector $X_{LPQ}$ obtained in step S600 are cascaded to achieve dimension reduction by principal component analysis to obtain fusion feature data $X_m$. The fusion feature data fusing the LBP features and the LPQ features has stronger data features, which is conducive to improve the accuracy of SAR image recognition.

The principal component analysis is mapping an n-dimensional feature to a k-dimensional feature. The k-dimensional feature is a new orthogonal feature, also referred to as a principal component. The principal component analysis is finding a set of mutually orthogonal coordinate axes sequentially from the original space. The selection of new coordinate axes is closely related to data of the n-dimensional feature. A first new coordinate axis is selected in a direction with the largest variance in the original data, a second new coordinate axis is selected such that the variance in a plane orthogonal to the first coordinate axis is the largest, the third axis is selected such that the variance in a plane orthogonal to the first and second axes is the largest, and so on, and then n such coordinate axes, i.e., new coordinate axes obtained in this manner, can be obtained. Only the first k coordinate axes including most of the variances are retained, while the coordinate axes including almost zero variance are ignored to realize dimension reduction of data features.

Figure 2:
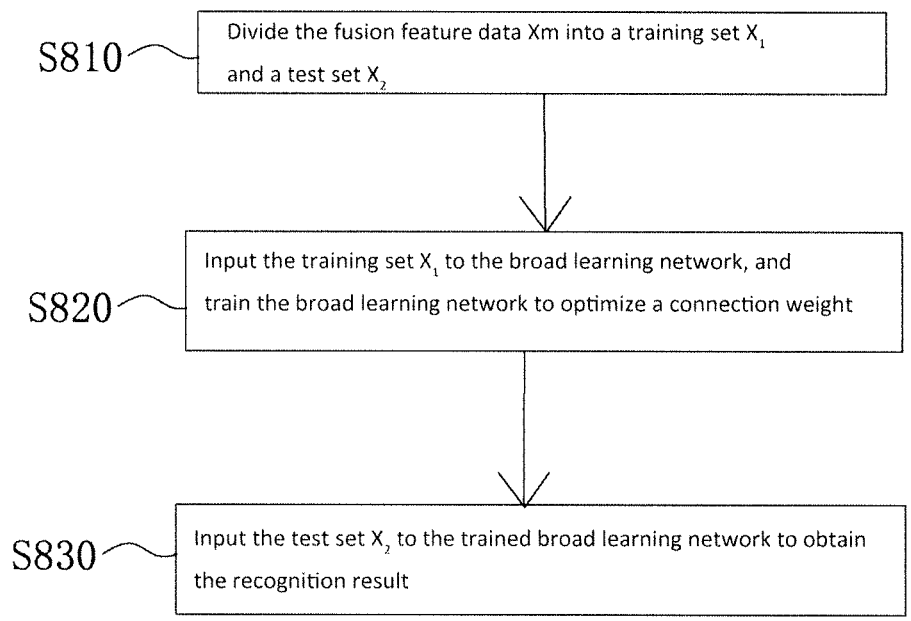
FIG. 2 is a specific flowchart of step S800 of FIG. 1.

Referring to FIG. 2, in step S800, the fusion feature data $X_m$ is input to a broad learning network.

In S810, the fusion feature data $X_m$ is divided into a training set $X_1$ and a test set $X_2$, and the training set $X_1$ and the test set $X_2$ are z-score standardized.

In S820, the training set $X_1$ is input to train the broad learning network, including:

S821: generating feature nodes by:

inputting the training set $X_1$ to realize projection and generate i groups of feature nodes, wherein the $i^{th}$ group of feature nodes are $Z_i = \phi(X_1 W_{ei} + \beta_{ei})$, where $W_{ei}$ is a random matrix, $\beta_{ei}$ is an offset, and $\phi(\cdot)$ is a nonlinear activation function;

S822: generating enhanced nodes by:

inputting the training set $X_1$ to realize projection and generate m groups of enhanced nodes, wherein the $m^{th}$ group of enhanced nodes are $H_m = \xi(Z^n W_{hm} + \beta_{hm})$, where $W_{hm}$ is a random matrix different from $W_{ei}$, $\beta_{hm}$ is an offset different from $\beta_{ei}$, $\xi(\cdot)$ is a nonlinear activation function different from $\phi(\cdot)$, and $Z^n$ denotes all the feature nodes; and S823: optimizing the connection weight by:

connecting the $i^{th}$ group of feature nodes and the $m^{th}$ group of enhanced nodes to obtain a combined matrix to serve as an actual input of the broad learning network, the output matrix of the broad learning network is: $Y = [Z_i | H_m] W_m$, and the connection weight of the broad learning network is: $W_m = [Z_i | H_m]^+ Y$; and continuously training the broad learning network by the training set $X_1$ to optimize the connection weight.

In S830, the test set $X_2$ is input to the trained broad learning network to obtain the recognition result. An accurate, fast and adaptive SAR image recognition technique is realized by using low resource demand, fast training and incremental learning characteristics of the broad learning network.

Figure 3:
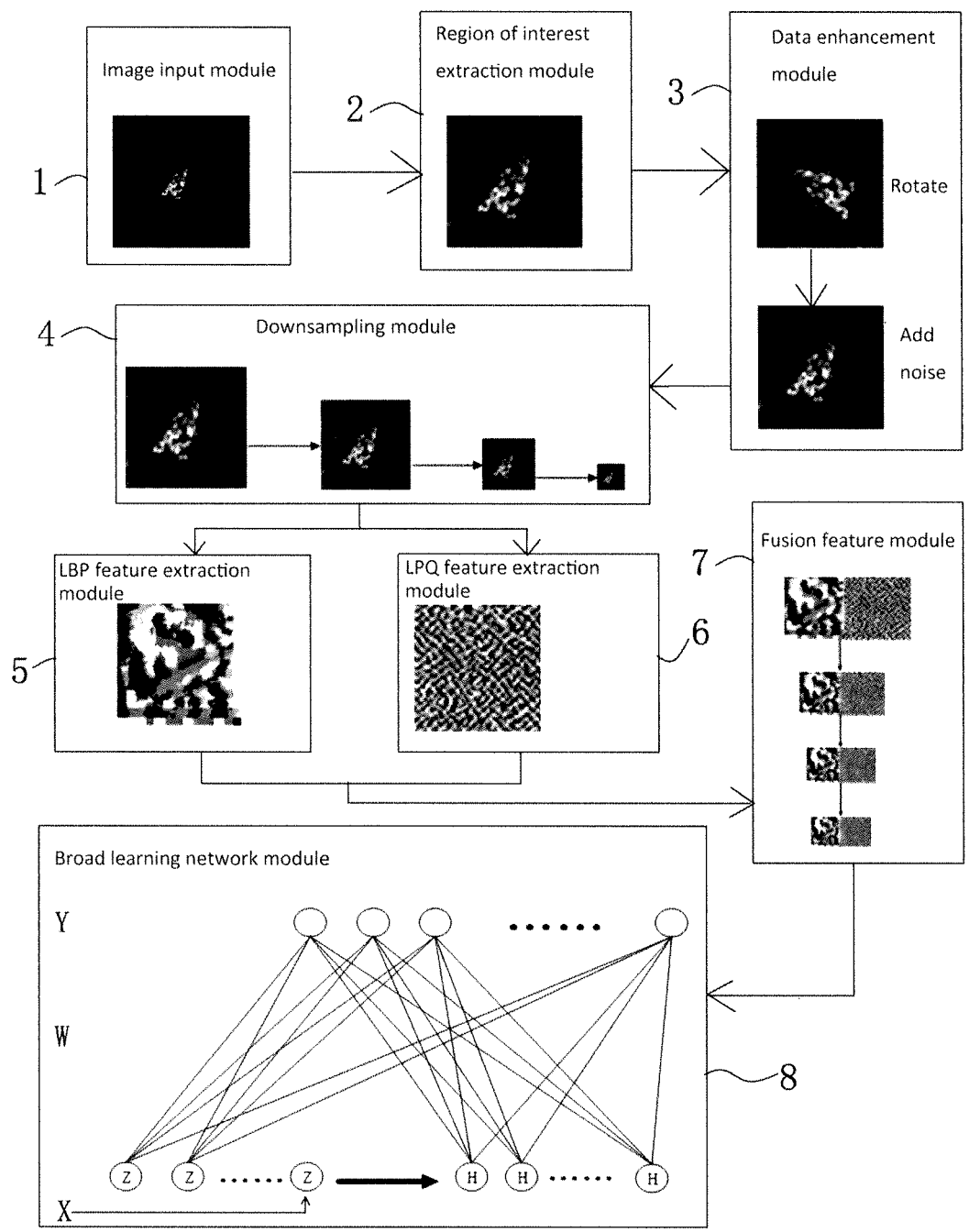
FIG. 3 is a schematic structural diagram of an apparatus for SAR image recognition based on multi-scale features and broad learning according to an embodiment of the present disclosure.

Referring to FIG. 3, another embodiment of the present disclosure provides an apparatus for SAR image recognition based on multi-scale features and broad learning applied to the method for SAR image recognition based on multi-scale features and broad learning, including:

an image input module 1 that performs step S100, for inputting an original SAR image;

a region of interest extraction module 2 that performs step S200, for extracting a region of interest of the original SAR image by centroid localization to obtain an SAR image including the region of interest;

a data enhancement module 3 that performs step S300, for rotating the SAR image including the region of interest and adding noise to enhance the data volume to obtain a data-enhanced SAR image;

a downsampling module 4 that performs step S400, for downsampling the data-enhanced SAR image to obtain a multi-scale SAR image;

an LBP feature extraction module 5 that performs step S500, for extracting LBP features of the multi-scale SAR image to obtain an LBP feature vector $X_{LBP}$;

an LPQ feature extraction module 6 that performs step S600, for extracting LPQ features of the multi-scale SAR image to obtain an LPQ feature vector $X_{LPQ}$;

a fusion feature module 7 that performs step S700, for cascading the LBP feature vector $X_{LBP}$ and the LPQ feature vector $X_{LPQ}$ to achieve dimension reduction by principal component analysis to obtain fusion feature data $X_m$; and a broad learning network module 8 that performs step S810 to step S830, for inputting the fusion feature data $X_m$ to a broad learning network for image recognition and outputting a recognition result.

Further, in the region of interest extraction module 2, a centroid coordinate is determined first according to a centroid formula; an L*L region of interest with the centroid as the center is obtained, and then the SAR image including the region of interest is obtained, wherein L is an edge length of the region of interest, and L is smaller than the length and width of the original SAR image; the centroid formula is $$(x_c, y_c) = \left(\frac{m_{10}}{m_{00}}, \frac{m_{01}}{m_{00}}\right),$$

where $(x_c,y_c)$ is the centroid coordinate, $m_{10}$ and $m_{01}$ are a first-order original matrix of the original SAR image, and $m_{00}$ a zero-order original matrix of the original SAR image.

Further, in the data enhancement module 3, the SAR image including the region of interest is rotated 360 degrees every 1 degree, achieving 360 times data enhancement; a random integer is added to the rotated SAR image as random noise to further enhance the data. The random integer is any integer in [−8, 8].

Further, in the downsampling module 4, the data-enhanced SAR image is downsampled. The downsampling is to reduce the pixels of the image to obtain a multi-scale SAR image.

Further, in the LBP feature extraction module 5, the LBP features of the multi-scale SAR image are extracted by an LBP feature operator. The LBP features are a data matrix, and cascade fusion refers to horizontal parallel connection of the data matrix corresponding to the LBP features, and then the LBP feature vector $X_{LBP}$ is obtained. The LBP feature operator is $$LBP_{p,r}(x_c, y_c) = \sum_{p=0}^{p-1} s(g_p - g_c) 2^p,$$

$$s(x) = \begin{cases} 1, & x \geq 0 \\ 0, & \text{others} \end{cases};$$

where $(x_c,y_c)$ is the centroid coordinate, $g_c$ is a centroid grayscale value, $g_p$ are pixel points distributed equidistantly on the circumference with the centroid as the center of a circle and r as the radius, and p is the number of $g_p$.

Further, in the LPQ feature extraction module 6, LPQ features of the multi-scale SAR image are extracted by an LPQ algorithm, and then the LPQ features are cascaded and fused to obtain an LPQ feature vector $X_{LPQ}$.

Further, in the fusion feature module 7, the LBP feature vector $X_{LBP}$ obtained in the LBP feature extraction module 5 and the LPQ feature vector $X_{LPQ}$ obtained in the LPQ feature extraction module 6 are cascaded to achieve dimension reduction by principal component analysis to obtain fusion feature data $X_m$. The fusion feature data fusing the LBP features and the LPQ features has stronger data features, which is conducive to improve the accuracy of SAR image recognition.

Further, the broad learning network module 8 includes a broad learning network model. The fusion feature data $X_m$ obtained from the fusion feature module 7 is input first, then the fusion feature data $X_m$ is divided into a training set $X_1$ and a test set $X_2$, and the training set $X_1$ and the test set $X_2$ are z-score standardized.

The training set $X_1$ is input to train the broad learning network, including:
  generating feature nodes by:
    inputting the training set $X_1$ to realize projection and generate i groups of feature nodes, wherein the $i^{th}$ group of feature nodes are $Z_i=\phi(X_1 W_{ei}+\beta_{ei})$, where $W_{ei}$ is a random matrix, $\beta_{ei}$ is an offset, and $\phi(\cdot)$ is a nonlinear activation function;
  generating enhanced nodes by:
    inputting the training set $X_1$ to realize projection and generate m groups of enhanced nodes, wherein the $m^{th}$ group of enhanced nodes are $H_m \equiv \xi(Z^n W_{hm}+\beta_{hm})$, where $W_{hm}$ is a random matrix different from $W_{ei}$, $\beta_{hm}$ is an offset different from $\beta_{ei}$, $\xi(\cdot)$ is a nonlinear activation function different from $\phi(\cdot)$, and $Z^n$ denotes all the feature nodes; and
  optimizing the connection weight by:
    connecting the $i^{th}$ group of feature nodes and the $m^{th}$ group of enhanced nodes to obtain a combined matrix to serve as an actual input of the broad learning network, the output matrix of the broad learning network is: $Y=[Z_i|H_m]W_m$, and the connection weight of the broad learning network is: $W_m=[Z_i|H_m]^+Y$; and continuously training the broad learning network by the training set $X_1$ to optimize the connection weight.

The test set $X_2$ is input to the trained broad learning network to obtain the recognition result. An accurate, fast and adaptive SAR image recognition technique is realized by using low resource demand, fast training and incremental learning characteristics of the broad learning network.

In addition, another embodiment of the present disclosure provides an apparatus for SAR image recognition, including a processor and a memory for connecting to the processor. The memory stores an instruction executable by the processor, and when executed by the processor, the instruction enables the processor to perform the method for SAR image recognition based on multi-scale features and broad learning as described above.

Another embodiment of the present disclosure provides a storage medium. The storage medium stores a computer executable instruction for causing a computer to perform the method for SAR image recognition based on multi-scale features and broad learning as described above.

According to the apparatus for SAR image recognition applied to the method for SAR image recognition based on multi-scale features and broad learning and the storage medium, the fusion feature data fusing the LBP features and LPQ features is used as an input of a broad learning network, which reduces redundant information and improves feature extraction performance while making full use of complementary information; the broad learning network is used to recognize an SAR image, which has a fast training speed, greatly reduces the time cost, and also reduces noise influences in the SAR image; as a result, the recognition effect is more stable, robust and reliable.

The above only describes the preferred embodiments of the present disclosure. The present disclosure is not limited to the above implementation modes. Any implementation mode should be encompassed in the protection scope of the present disclosure as long as it achieves the technical effect of the present disclosure with the same means.

What is claimed is:

1. A method for synthetic aperture radar (SAR) image recognition based on multi-scale features and broad learning, the method comprising:

inputting an original SAR image;

obtaining an SAR image including a region of interest by extracting the region of interest of the original SAR image by centroid localization;

obtaining a data-enhanced SAR image by rotating the SAR image including the region of interest and adding noise to enhance a data volume;

obtaining a multi-scale SAR image by downsampling the data-enhanced SAR image;

obtaining a local binary pattern (LBP) feature vector $X_{LBP}$ by extracting a LBP feature of the multi-scale SAR image;

obtaining a local phase quantization (LPQ) feature vector $X_{LPQ}$ by extracting a LPQ feature of the multi-scale SAR image;

obtaining a fusion feature data $X_m$ by cascading the LBP feature vector $X_{LBP}$ and the LPQ feature vector $X_{LPQ}$ to achieve a dimension reduction by principal component analysis; and outputting a recognition result by inputting the fusion feature data $X_m$ to a broad learning network for image recognition, wherein outputting the recognition result includes:

dividing the fusion feature data $X_m$, into a training set $X_1$ and a test set $X_2$;

optimizing a connection weight by inputting the training set $X_1$ to the broad learning network, and training the broad learning network; and obtaining the recognition result by inputting the test set $X_2$ to the trained broad learning network.

2. The method according to claim 1, wherein obtaining the SAR image including the region of interest comprises:

determining a centroid coordinate according to a centroid formula;

obtaining an L*L region of interest with the centroid coordinate as the center, and then obtaining the SAR image including the region of interest;

wherein L is an edge length of the region of interest, and wherein the centroid formula is $$(x_c, y_c) = \left(\frac{m_{10}}{m_{00}}, \frac{m_{01}}{m_{00}}\right),$$

where $(x_c, y_c)$ is the centroid coordinate, $m_{10}$ and $m_{01}$ are a first-order original matrix of the original SAR image, and $m_{00}$ is a zero-order original matrix of the original SAR image.

3. The method according to claim 2, wherein obtaining the LBP feature vector $X_{LBP}$ comprises:

extracting the LBP feature of the multi-scale SAR image by an LBP feature operator; and obtaining the LBP feature vector $X_{LBP}$ by cascading and fusing the LBP feature;

wherein the LBP feature operator is $$LBP_{p,r}(x_c, y_c) = \sum_{p=0}^{p-1} s(g_p - g_c)2^p,$$

$$s(x) = \begin{cases} 1, & x \geq 0 \\ 0, & \text{others} \end{cases};$$

where $(x_c, y_c)$ is the centroid coordinate, $g_c$ is a centroid grayscale value, $g_p$ are pixel points distributed equidistantly on a circumference with the centroid coordinate as the center of a circle and r as a radius, where p is a number of $g_p$.

4. The method according to claim 1, wherein optimizing the connection weight comprises:

generating feature nodes by inputting the training set $X_1$ to realize projection and generate i groups of feature nodes, wherein the $i^{th}$ group of feature nodes are $Z_i = \phi(X_1 W_{ei} + \beta_{ei})$, where $W_{ei}$ is a random matrix, $\beta_{ei}$ is an offset, and $\phi(\bullet)$ is a nonlinear activation function;

generating enhanced nodes by inputting the training set $X_1$ to realize projection and generate m groups of enhanced nodes, wherein the $m^{th}$ group of enhanced nodes are $H_m \equiv \xi(Z^n W_{hm} + \beta_{hm})$, where $W_{hm}$ is a random matrix different from $W_{ei}$, $\beta_{hm}$ is an offset different from $\beta_{ei}$, $\xi(\bullet)$ is a nonlinear activation function different from $\phi(\bullet)$, and $Z^n$ denotes all the feature nodes; and optimizing the connection weight by connecting the $i^{th}$ group of feature nodes and the $m^{th}$ group of enhanced nodes to obtain a combined matrix to serve as an actual input of the broad learning network, and calculating the connection weight of the broad learning network according to an output matrix Y as: $W_m = [Z_i | H_m]^+ Y$, and continuously training the broad learning network by the training set $X_1$ to optimize the connection weight.

5. An apparatus for synthetic aperture radar (SAR) image recognition based on multi-scale features and broad learning, the apparatus comprising:

an image input module configured to input an original SAR image;

a region of interest extraction module configured to obtain an SAR image including a region of interest by extracting a region of interest of the original SAR image by centroid localization;

a data enhancement module configured to obtain a data-enhanced SAR image by rotating the SAR image including the region of interest and adding noise to enhance a data volume;

a downsampling module configured to obtain a multi-scale SAR image by downsampling the data-enhanced SAR image;

a local binary pattern (LBP) feature extraction module for obtaining configured to obtain an LBP feature vector $X_{LBP}$ by extracting LBP features of the multi-scale SAR image;

a local phase quantization (LPQ) feature extraction module configured to obtain an LPQ feature vector $X_{LPQ}$ by extracting LPQ features of the multi-scale SAR image;

a fusion feature module configured to obtain fusion feature data $X_m$ by cascading the LBP feature vector $X_{LBP}$ and the LPQ feature vector $X_{LPQ}$ to achieve a dimension reduction by principal component analysis; and a broad learning network module configured to output a recognition result by inputting the fusion feature data $X_m$ to a broad learning network for image recognition, wherein to output the recognition result, the broad learning network module is further configured to:

divide the fusion feature data $X_m$ into a training set $X_1$ and a test set $X_2$;

optimize a connection weight by inputting the training set $X_1$ to the broad learning network, and training the broad learning network; and obtain the recognition result by inputting the test set $X_2$ to the trained broad learning network.

6. The apparatus according to claim 5, wherein to obtain the SAR image including the region of interest, the region of interest extraction module is further configured to:

determine a centroid coordinate according to a centroid formula;

obtain an L*L region of interest with the centroid coordinate as the center, and then obtaining the SAR image including the region of interest;

wherein L is an edge length of the region of interest, and wherein the centroid formula is $$(x_c, y_c) = \left(\frac{m_{10}}{m_{00}}, \frac{m_{01}}{m_{00}}\right),$$

where $(x_c, y_c)$ is the centroid coordinate, $m_{10}$ and $m_{01}$ are a first-order original matrix of the original SAR image, and $m_{00}$ is a zero-order original matrix of the original SAR image.

7. The apparatus according to claim 6, wherein to obtain the LBP feature vector $X_{LBP}$, the LBP feature extraction module is further configured to:

extract the LBP feature of the multi-scale SAR image by an LBP feature operator; and obtain the LBP feature vector $X_{LBP}$ by cascading and fusing the LBP feature;

wherein the LBP feature operator is $$LBP_{p,r}(x_c, y_c) = \sum_{p=0}^{p-1} s(g_p - g_c) 2^p,$$

$$s(x) = \begin{cases} 1, & x \geq 0 \\ 0, & \text{others} \end{cases};$$

where $(x_c, y_c)$ is the centroid coordinate, $g_c$ is a centroid grayscale value, $g_p$ are pixel points distributed equidistantly on a circumference with the centroid coordinate as the center of a circle and r as a radius, where p is a number of $g_p$.

8. The apparatus according to claim 5, wherein to optimize the connection weight, the broad learning network module is further configured to:

generate feature nodes by inputting the training set $X_i$ to realize projection and generate i groups of feature nodes, wherein the $i^{th}$ group of feature nodes are $Z_i = \phi(X_1 W_{ei} + \beta_{ei})$, where $W_{ei}$ is a random matrix, $\beta_{ei}$ is an offset, and $\phi(\cdot)$ is a nonlinear activation function;

generate enhanced nodes by inputting the training set $X_i$ to realize projection and generate m groups of enhanced nodes, wherein the $m^{th}$ group of enhanced nodes are $H_m \equiv \xi(Z^n W_{hm} + \beta_{hm})$, where $W_{hm}$ is a random matrix different from $W_{ei}$, $\beta_{hm}$ is an offset different from $\beta_{ei}$, $\xi(\cdot)$ is a nonlinear activation function different from $\phi(\cdot)$ and $Z^n$ denotes all the feature nodes; and optimize the connection weight by connecting the $i^{th}$ group of feature nodes and the $m^{th}$ group of enhanced nodes to obtain a combined matrix to serve as an actual input of the broad learning network, and calculating the connection weight of the broad learning network according to an output matrix Y as: $W_m = [Z_i | H_m]^+ Y$, and continuously training the broad learning network by the training set $X_i$ to optimize the connection weight.

9. A method for synthetic aperture radar (SAR) image recognition based on multi-scale features and broad learning, the method comprising:

inputting an original SAR image;

obtaining an SAR image including a region of interest by extracting the region of interest of the original SAR image by centroid localization;

obtaining a data-enhanced SAR image by rotating the SAR image including the region of interest and adding noise to enhance a data volume;

obtaining a multi-scale SAR image by downsampling the data-enhanced SAR image;

obtaining a local binary pattern (LBP) feature vector $X_{LBP}$ by extracting a LBP feature of the multi-scale SAR image;

obtaining a local phase quantization (LPQ) feature vector $X_{LPQ}$ by extracting a LPQ feature of the multi-scale SAR image;

obtaining a fusion feature data $X_m$ by cascading the LBP feature vector $X_{LBP}$ and the LPQ feature vector $X_{LPQ}$ to achieve a dimension reduction by principal component analysis; and outputting a recognition result by inputting the fusion feature data $X_m$ to a broad learning network for image recognition;

wherein obtaining the SAR image including the region of interest comprises:

determining a centroid coordinate according to a centroid formula;

obtaining an L*L region of interest with the centroid coordinate as the center, and then obtaining the SAR image including the region of interest;

wherein L is an edge length of the region of interest, and wherein the centroid formula is $$(x_c, y_c) = \left(\frac{m_{10}}{m_{00}}, \frac{m_{01}}{m_{00}}\right),$$

where $(x_c, y_c)$ is the centroid coordinate, $m_{10}$ and $m_{01}$ are a first-order original matrix of the original SAR image, $m_{00}$ is a zero-order original matrix of the original SAR image.

10. The method according to claim 6, wherein obtaining the LBP feature vector $X_{LBP}$ comprises:

extracting the LBP feature of the multi-scale SAR image by an LBP feature operator; and obtaining the LBP feature vector $X_{LBP}$ by cascading and fusing the LBP feature;

wherein the LBP feature operator is $$LBP_{p,r}(x_c, y_c) = \sum_{p=0}^{p-1} s(g_p - g_c) 2^p,$$

$$s(x) = \begin{cases} 1, & x \geq 0 \\ 0, & \text{others} \end{cases};$$

where $(x_c, y_c)$ is the centroid coordinate, $g_c$ is a centroid grayscale value, $g_p$ are pixel points distributed equidistantly on a circumference with the centroid coordinate as the center of a circle and r as a radius, where p is a number of $g_p$.

* * * * *